US008584403B2

(12) United States Patent
Frelier

(10) Patent No.: US 8,584,403 B2
(45) Date of Patent: Nov. 19, 2013

(54) FLUID FLOW CHANNEL AND SCAVENGER SYSTEM

(76) Inventor: Calvin A. Frelier, Rochester, NY (US)

( * ) Notice: Subject to any disclaimer, the term of this patent is extended or adjusted under 35 U.S.C. 154(b) by 298 days.

(21) Appl. No.: 12/930,218

(22) Filed: Jan. 3, 2011

(65) Prior Publication Data

US 2012/0168360 A1 Jul. 5, 2012

(51) Int. Cl.
*E04D 13/00* (2006.01)
*B01D 29/00* (2006.01)
*A47L 13/02* (2006.01)

(52) U.S. Cl.
USPC ............ 52/12; 210/497.1; 210/162; 210/484; 52/11; 52/13; 52/15; 15/1; 15/143.1; 15/236.01; 15/236.04

(58) Field of Classification Search
USPC .............. 210/137, 143, 747.5, 162, 163, 164, 210/484, 496, 471; 52/12, 15, 236.1; 401/289; 209/627, 385, 387; 15/1, 15/236.01, 236.04
See application file for complete search history.

(56) References Cited

U.S. PATENT DOCUMENTS

| | | | | |
|---|---|---|---|---|
| 3,633,238 | A * | 1/1972 | Parker | 15/250.21 |
| 3,638,274 | A * | 2/1972 | Farver | 15/250.41 |
| 4,060,872 | A * | 12/1977 | Bucklitzsch | 15/250.04 |
| 4,745,653 | A * | 5/1988 | Bliznak | 15/250.04 |
| 4,750,883 | A * | 6/1988 | Drake | 401/137 |
| 5,802,774 | A * | 9/1998 | Kardacz | 52/11 |
| 6,357,077 | B1 * | 3/2002 | Jones et al. | 16/44 |
| 7,610,721 | B1 * | 11/2009 | Frelier | 52/11 |
| 2006/0230687 | A1 * | 10/2006 | Ealer | 52/12 |
| 2009/0065165 | A1 * | 3/2009 | Strauch | 162/272 |
| 2009/0265940 | A1 * | 10/2009 | Wahl | 30/169 |

OTHER PUBLICATIONS

Building Construction, “43. Molded Eaves Gutters”; Aug. 25, 2009; vol. 3; Figure 31.*
Building Construction; “43. Molded Eaves Gutters”; Aug. 25, 2009; vol. 3; Figure 31; http://web.archive.org/web/20090825193835/http://chestofbooks.com/architecture/Building-Construction-V3/43-Molded-Eaves-Gutters.html.*

* cited by examiner

*Primary Examiner* — Nam Nguyen
*Assistant Examiner* — Richard Gurtowski

(57) ABSTRACT

A fluid flow channel may include a scavenger system, which may expel solids from the channel. The channel may be supported by structure and include a floor surface, a transition surface, and a ramp surface. The scavenger system may include an actuator that may be pivotally mounted to the structure. The actuator may be attached to a face plate framework which may include a box structure for increased strength. The actuator may propel the face plate framework across the floor surface, transition surface and ramp surface of the channel. The face plate framework may be adapted for rolling reciprocating contact with the channel surface. The channel floor may afford a park position for the scavenger system and the ramp surface may be angled to reduce jamming of the scavenger system. The channel may also include a wear plate to reduce wear between the scavenger system and the channel.

3 Claims, 10 Drawing Sheets

FLUID FLOW CHANNEL AND SCAVENGER SYSTEM

BACKGROUND

The present disclosure relates to mechanized self clearing fluid flow systems.

This section provides background information related to the present disclosure which is not necessarily prior art.

A Mechanized Self Clearing Fluid Flow Drainage System, to be commercially viable, must be able to expel solids that may be heavier in nature.

U.S. Pat. No. 7,610,721 issued Nov. 3, 2009 shows a device that is suitable for roof drainage where the debris is light.

SUMMARY

In summary, this disclosure pertains to a fluid flow channel that may include a scavenger system, which may expel solids from the channel. The channel may be supported by structure and include a floor surface, a transition surface, and a ramp surface. The scavenger system may also include an actuator that may be pivotally mounted to the structure. The actuator may be attached to a face plate framework which may include a box structure for increased strength. The actuator may propel the face plate framework across the floor surface, transition surface and ramp surface of the channel. The face plate framework may be adapted for rolling reciprocating contact with the channel surface. The channel floor may afford a park position for the scavenger system and the ramp surface may be angled to reduce jamming of the scavenger system. The channel may also include a wear plate to reduce wear between the scavenger system and the channel.

BRIEF DESCRIPTION OF THE DRAWINGS

The drawings described herein are for illustrative purposes only and are not intended to limit the scope of the present disclosure in any way.

DETAILED DESCRIPTION

Examples of the present disclosure will now be described more fully with reference to the accompanying drawings. The following description is merely exemplary in nature and is not intended to limit the present disclosure, application, or uses.

Figure 1A:
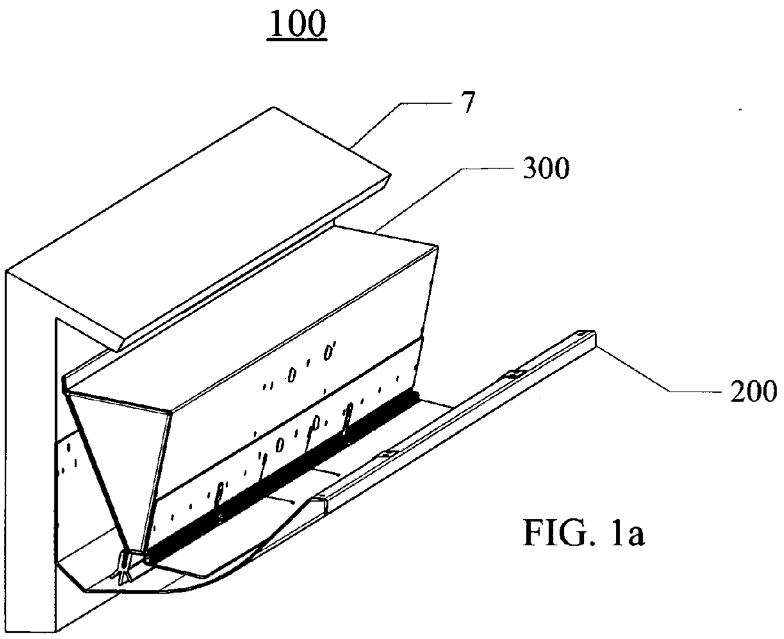
FIG. 1*a* is a left front perspective view of the combination fluid flow channel and scavenger system 100 in the park position while attached to a structure.
Figure 1B:
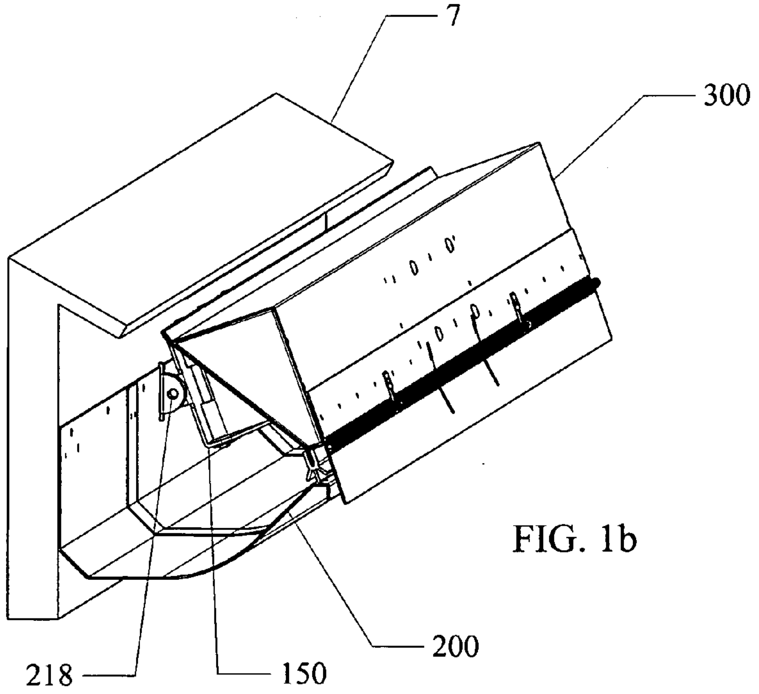
FIG. 1*b* is a left front perspective view of the combination fluid flow channel and scavenger system 100 in the open position while attached to a structure.

With reference now to the drawing figures: FIGS. 1*a* and 1*b* show a combination fluid flow channel and scavenger system 100 (hereinafter referred to as system 100) mounted to structure 7 under the edge of a sloped roof surface with scavenger assembly 300 in the retracted or park position. System 100 allows fluid to flow along its length with the capability to expel accumulated solids in a direction roughly perpendicular to its length. Fluid flow systems tend to collect debris in the fluid flow channel; reliable function requires debris removal to promote drainage. FIG. 1*b* shows system 100 mounted to structure 7 with scavenger assembly 300 in the forward position after debris expulsion resting on fluid flow channel 200. It also shows actuator 150 (prior art defined in U.S. Pat. No. 7,610,721) attached to hinge clip 218 with a shaft (not shown).

Figure 2B:
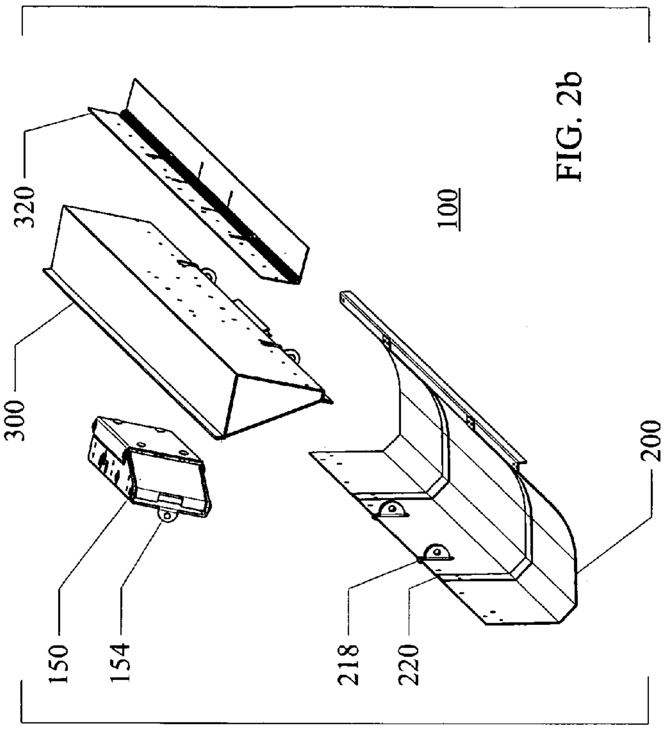
FIG. 2*b* is an exploded view of with a left front perspective of the combination fluid flow channel and scavenger system 100.
Figure 2A:
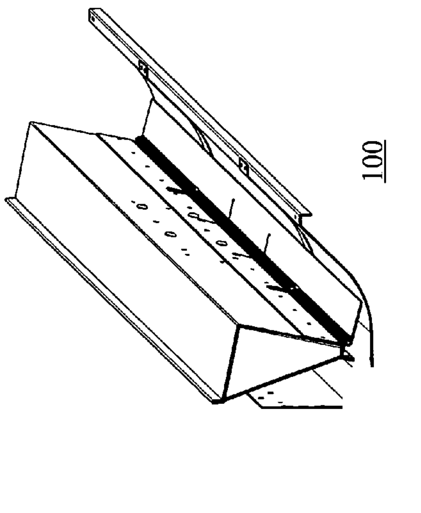
FIG. 2*a* is a left front perspective view of the combination fluid flow channel and scavenger system 100 in the park position.

FIG. 2*a* shows system 100 separate from supporting structure. FIG. 2*b* is an exploded view of system 440 that shows actuator 150 (prior art U.S. Pat. No. 7,610,721) pivotally connected to hinge clip 218 through pivot tab 154 using a shaft (not shown). Scavenger assembly 300 is fixed to actuator 150 to with fasteners. Spring loaded piano hinge 320 is fixed to the face of scavenger assembly 300 as shown in FIG. 2*a* using fasteners. The piano hinge 320 is optional for heavy debris.

FIG. 2*b* shows wear plates 220 attached to fluid flow channel 200. Wear plates 220 are stainless steel 0.035" thick, 4" wide with a profile to match the interior surface of fluid flow channel 200. Wear plates 220 provide a running surface for scavenger assembly 300 as it traverses the profile of fluid flow channel 200. Wear plates 220 are located approximately 28.5" from center, and suitably fixed to fluid flow channel 200. Fluid flow channel 200 is aluminum 0.05" thick, 120" in length, 3.8" in height, and approximately 6.8" in width.

Figure 2C:
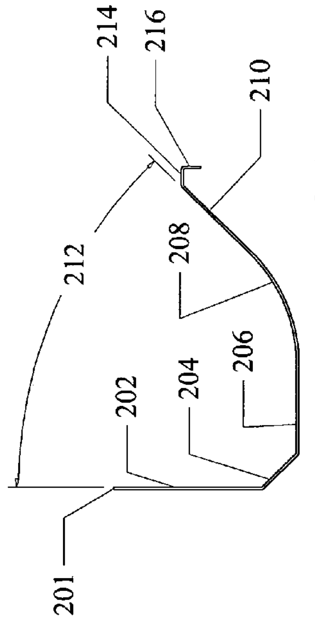
FIG. 2*c* is an end view of fluid flow channel 200.

FIG. 2*c* shows features of fluid flow channel 200 as follows: registration edge 201 and registration surface 202, which together determine the vertical and horizontal location of hinge clip 218 and the pivot axis for actuator 150 as shown in FIG. 2*b*. Registration surface 202 is approximately 3" tall. Material occlusion surface 204 is angled to reduce debris buildup behind scavenger assembly 300. Channel floor 206 is 1.8" across and supports scavenger assembly 300. Curved surface 208 is a transitional surface from channel floor 206 to ramp surface 210. Curved Surface 208 has a radius of 3.3" and a sweep of 45°. Ramp surface 210 supports scavenger assembly 300 as debris is pushed out of fluid flow channel 200.

Ramp surface 210 is approximately 2" long. Ramp angle 212 is 45°. Top surface 214 is a resting surface for scavenger assembly 300. Stop surface 216 limits over travel of spring loaded piano hinge 320. Fluid flow channel 200 is secured to structure 7 (shown in FIG. 1*a*) using regularly spaced fasteners.

Figure 3A:
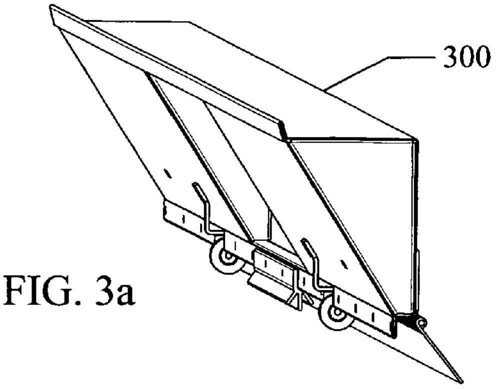
FIG. 3*a* is left rear perspective view of scavenger assembly 300.
Figure 3B:
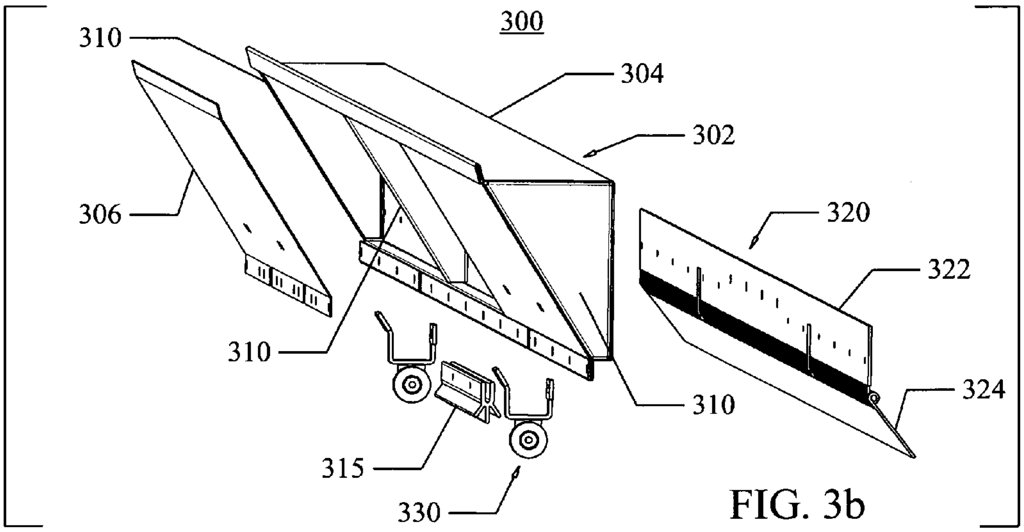
FIG. 3*b* is an exploded left rear perspective view of scavenger assembly 300.

FIG. 3*a* shows scavenger assembly 300. FIG. 3*b* is an exploded view of scavenger assembly 300. It shows face plate framework 302 which consists of face plate 304, rear plates 306, and end caps 310. The overall length of face plate framework 302 is 118.5". Face plate framework 302 provides the necessary rigidity to clear 10' long sections of fluid flow channel 200 without buckling or twisting. Face plate framework 302 is approximately 4.4" tail by 2.9" wide. Rear plate 306 slopes at approximately a 30° angle. Face plate 304, rear plate 306, and end cap 310 are constructed of 0.032" thick aluminum and suitably joined to each other.

FIG. 3*b* also shows a spring loaded piano hinge 320 and caster assembly 330. Spring loaded piano hinge 320 includes mounting plate 322 and wiper plate 324. Mounting plate 322 is 0.05" thick aluminum, and 118.5" long by 1.5" wide. Wiper plate 324 is 0.05" thick aluminum, and 118.5" in length and 1.5" wide. Wiper plate 324 is joined to mounting plate 322 by stainless steel pins 0.125" in diameter. Stainless steel torsion springs (not shown) provide approximately 2-3 inch-pound of torque total and bias wiper plate 324 against fluid flow channel 200. Spring loaded piano hinge 320 aids in evacuating debris that accumulates in fluid flow channel 200. Caster assembly 330 is suitably fixed to face plate framework 302 at a distance of approximately 28.5" from center with fasteners. Caster assembly 330 aids in supporting scavenger assembly and reducing friction as it traverses fluid flow channel 200.

Figure 7A:
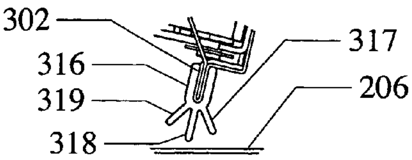
FIG. 7*a* through 7*e* are successive end views showing interaction between flexible wiper 315 and fluid flow channel 200.
Figure 8A:
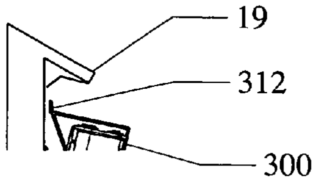
FIGS. 8*a* through 8*e* are successive end views showing the spatial relationship between scavenger system 440 and structure 7.
Figure 7B:
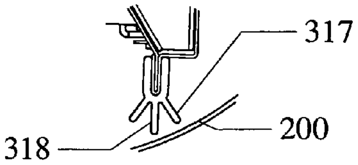
Figure 8B:
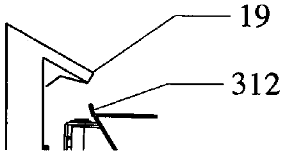
Figure 7C:
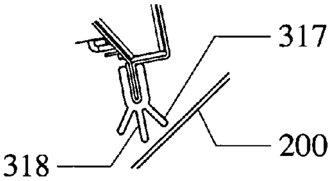
Figure 8C:
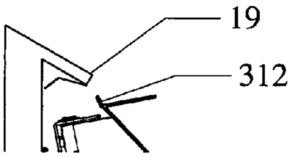
Figure 7D:
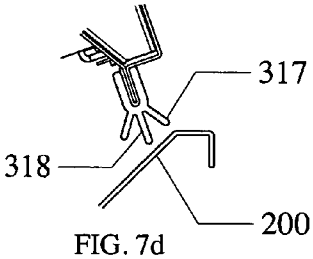
Figure 8D:
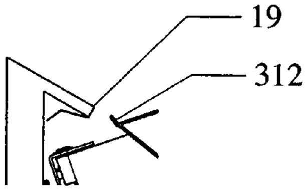
Figure 7E:
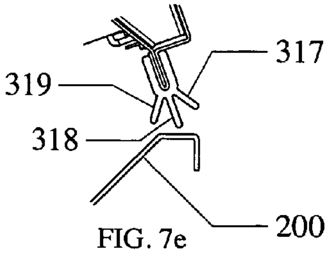
Figure 8E:
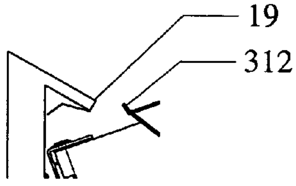

FIG. 3*b* also shows flexible wiper 315, which normally spans the entire length of scavenger assembly 300, except at caster assembly 330 locations. Flexible wiper 315 is fixed to face plate framework 302 using adhesive or fasteners. Flexible wiper 315 is fabricated in a continuous extrusion process and is made of EPDM Rubber with an approximate Shore A Durometer of 50. FIG. 7*a* shows wiper body 316, frontal blade 317, mid blade 318, and trailing blade 319. Flexible wiper 315 is approximately 0.86" tall overall. Measured from wiper body 316, mid blade 318 is 0.35" tall. Trailing blade 319 and frontal blade 317 are 0.31" tall. Trailing blade 319 and frontal blade 317 are angularly separated from mid blade 318 by 35°. Mid blade 318, trailing blade 319, and frontal blade 317 are 0.07" thick. Wiper body 316 is 0.28" thick.

Figure 3C:
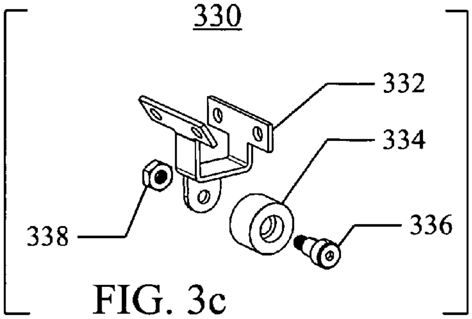
FIG. 3*c* is an exploded view of caster assembly 330.

FIG. 3*c* is an exploded view of caster assembly 330. Caster assembly 330 is comprised of caster bracket 332, roller 334, shoulder screw 336, and lock Nut 338. Caster bracket 332 is 0.075" thick stainless steel with a height and width of 1.4". Roller 334 is nylon with a diameter of 0.75" and a width of 0.48". Shoulder screw 336 is McMaster-Carr part number 94035A532. Lock nut 338 is McMaster-Carr part number 90101A225.

Figure 4A:
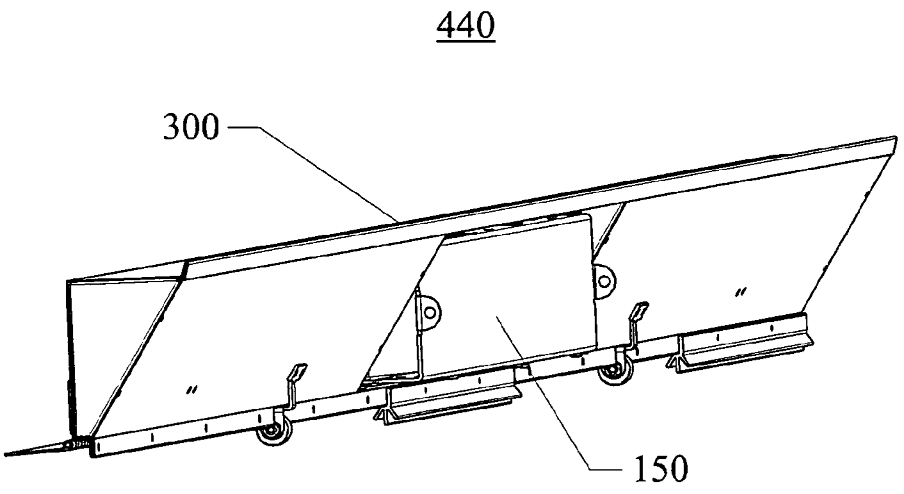
FIG. 4*a* is a rear perspective view of scavenger system 440.

FIG. 4*a* shows scavenger system 440 consisting of actuator 150 mounted to scavenger assembly 300 while viewing the rear side of scavenger assembly 300.

Figure 4B:
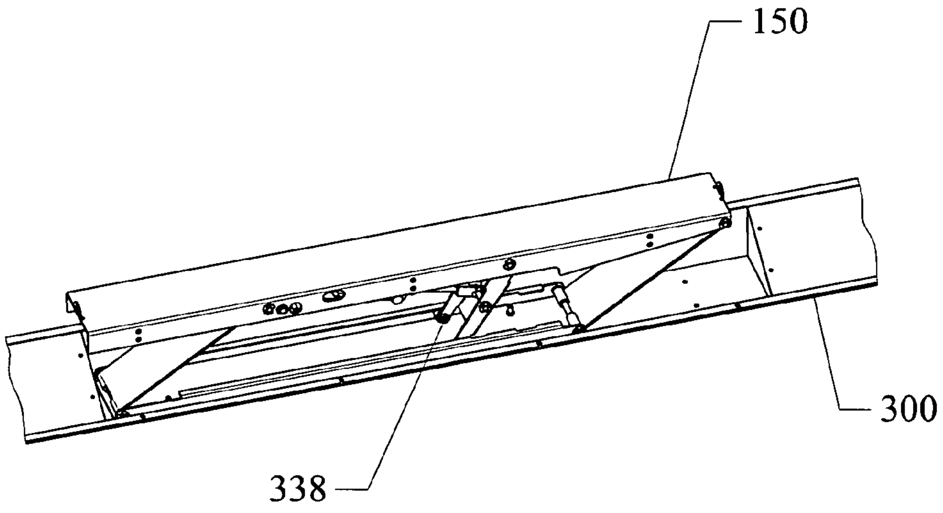
FIG. 4*b* is a rear partial view of actuator 150 mounted to scavenger assembly 300 with actuator 150 expanded.

FIG. 4*b* is a partial view of actuator 150 mounted to scavenger assembly 300 with actuator 150 expanded. In FIG. 4*b* orbital shaft (prior art not shown) defined in U.S. Pat. No. 7,610,721, is replaced by lock nut 338, shoulder screw (not shown), and roller (not shown) in an arrangement similar to caster assembly 330 shown in FIG. 3*c*.

Figure 5A:
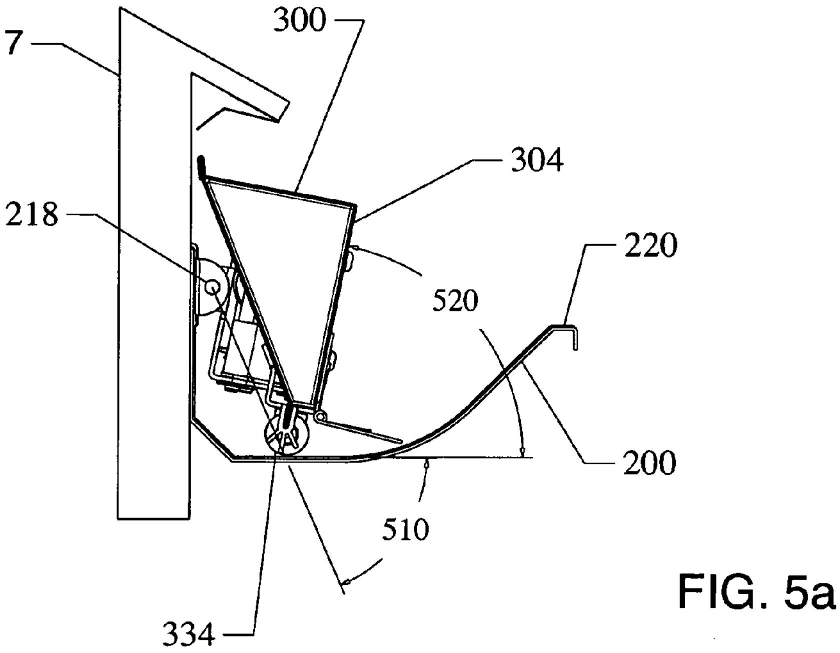
FIGS. 5*a* and 5*b* are end views of fluid flow channel 200 and scavenger system 440 depicting angular relationships.
Figure 5B:
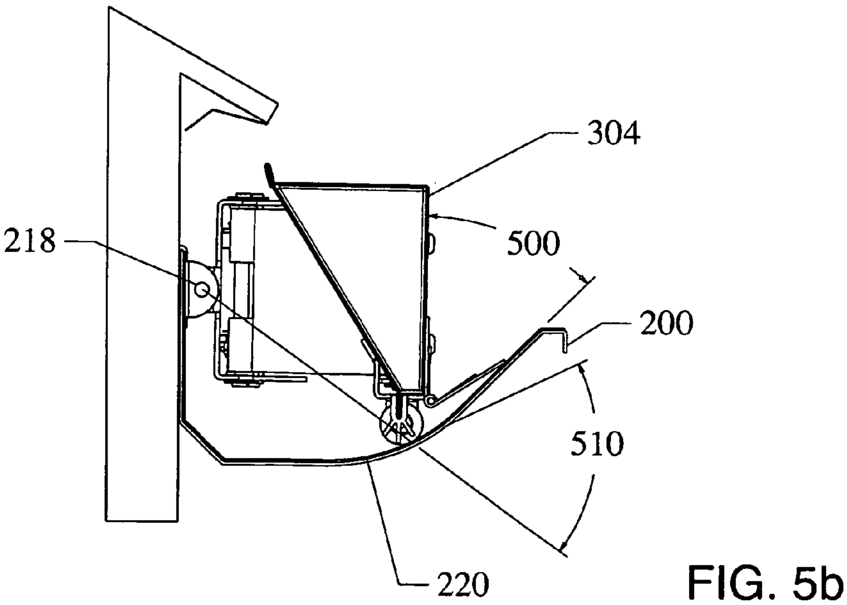

FIGS. 5*a* and 5*b* show resistance angle 510 as the angle created by a line originating at the hinge axis of hinge clip 218 and ending at the intersection of roller 334 and wear plate 220 and the tangent of roller 334 and wear plate 220. The cosine of angle 510 yields the fraction of actuator force available to overcome rolling resistance at the interface of roller 334 and wear plate 220. As angle 510 increases, the system requires more air pressure to operate. FIG. 5*a* shows a resistance angle 510 which is approximately 67°.

FIG. 5*a* shows parking angle 520 as the angle between face plate 304 of scavenger assembly 300 and wear plate 220. When parking angle 520 is less than approximately 78°, system 100 will remain in park position without air pressure. As parking angle 520 decreases, resistance angle 510 increases.

FIG. 5*b* shows pinch angle 500 which is defined as the angle between face plate 304 and ramp surface 210 (FIG. 2*c*).

Figure 6A:
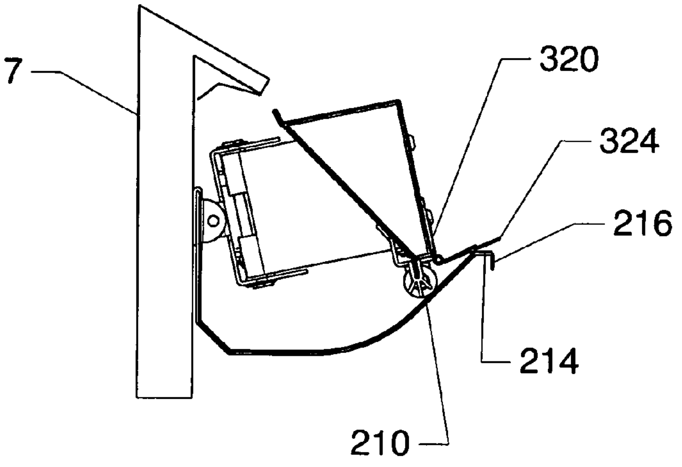
FIG. 6*a* through 6*c* are successive end views of fluid flow channel 200 and scavenger system 440 depicting interaction between scavenger system 440 and fluid flow channel 200.
Figure 6B:
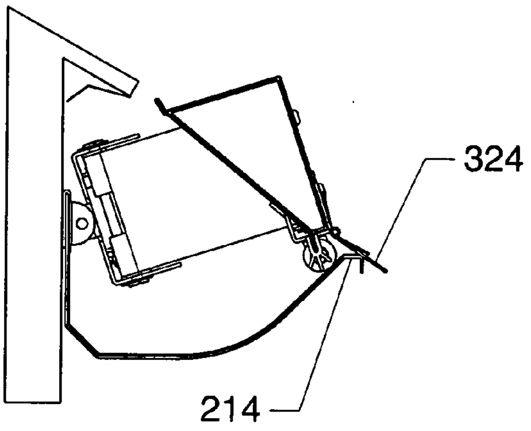
Figure 6C:
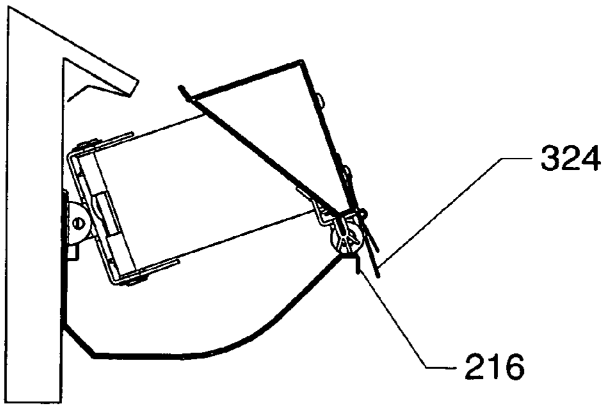

FIGS. 6*a*, 6*b*, and 6*c* sequentially show the interaction between spring loaded piano hinge 320, ramp surface 210, top surface 214, and stop surface 216.

FIGS. 7*a*-7*e* sequentially show the rotational interaction between flexible wiper 315 and the profile of fluid flow channel 200 as scavenger system 440 traverses during scavenging.

FIGS. 8*a*-8*e* sequentially show the spatial interaction between scavenger system 440 and structure 7.

Figure 9A:
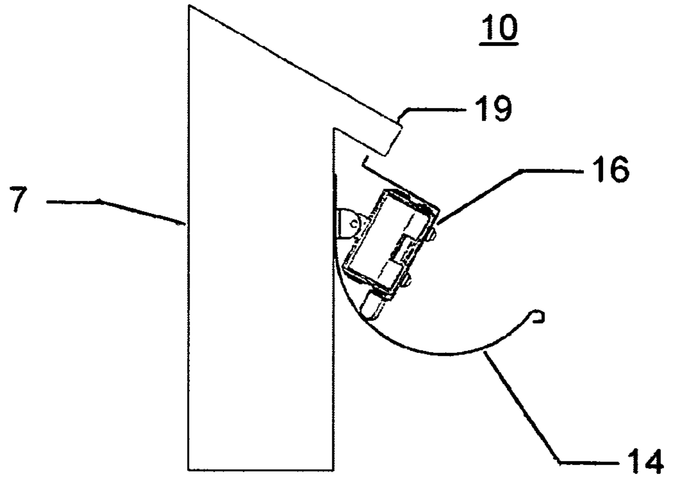
FIG. 9a Prior Art
FIGS. 9*a* through 9*c* show prior art successive end views of the Gutter Drainage and Debris Removal System 10 (prior art U.S. Pat. No. 7,610,721).

FIG. 9*a* is prior art that shows gutter section 14 mounted on support structure 7, drip edge 19, scavenger blade 16, and wiper 13, in the park position.

Figure 9B:
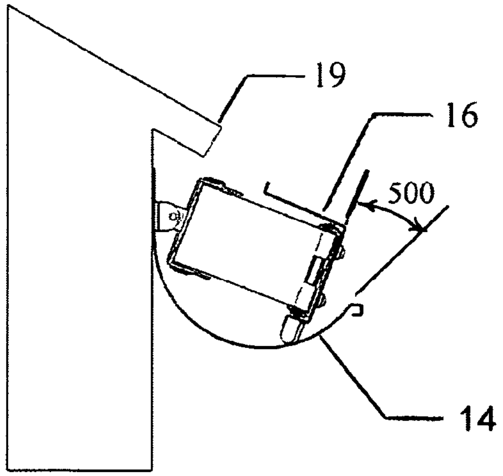
FIG. 9b Prior Art

FIG. 9*b* is prior art that shows drip edge 19, scavenger blade 16, gutter section 14, and pinch angle 500.

Figure 9C:
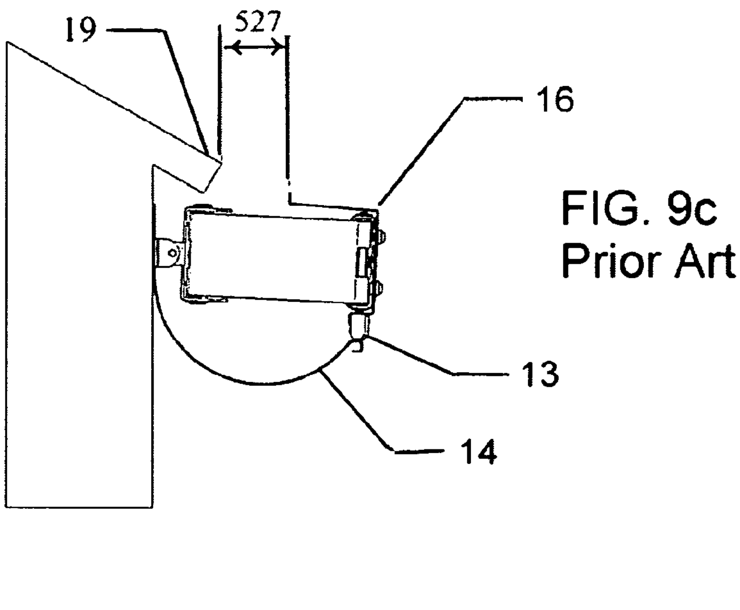
FIG. 9c Prior Art

FIG. 9*c* is prior art that shows drip edge 19, scavenger blade 16, gutter section 14, wiper 13 and gap 517 in the forward position.

Figure 10:
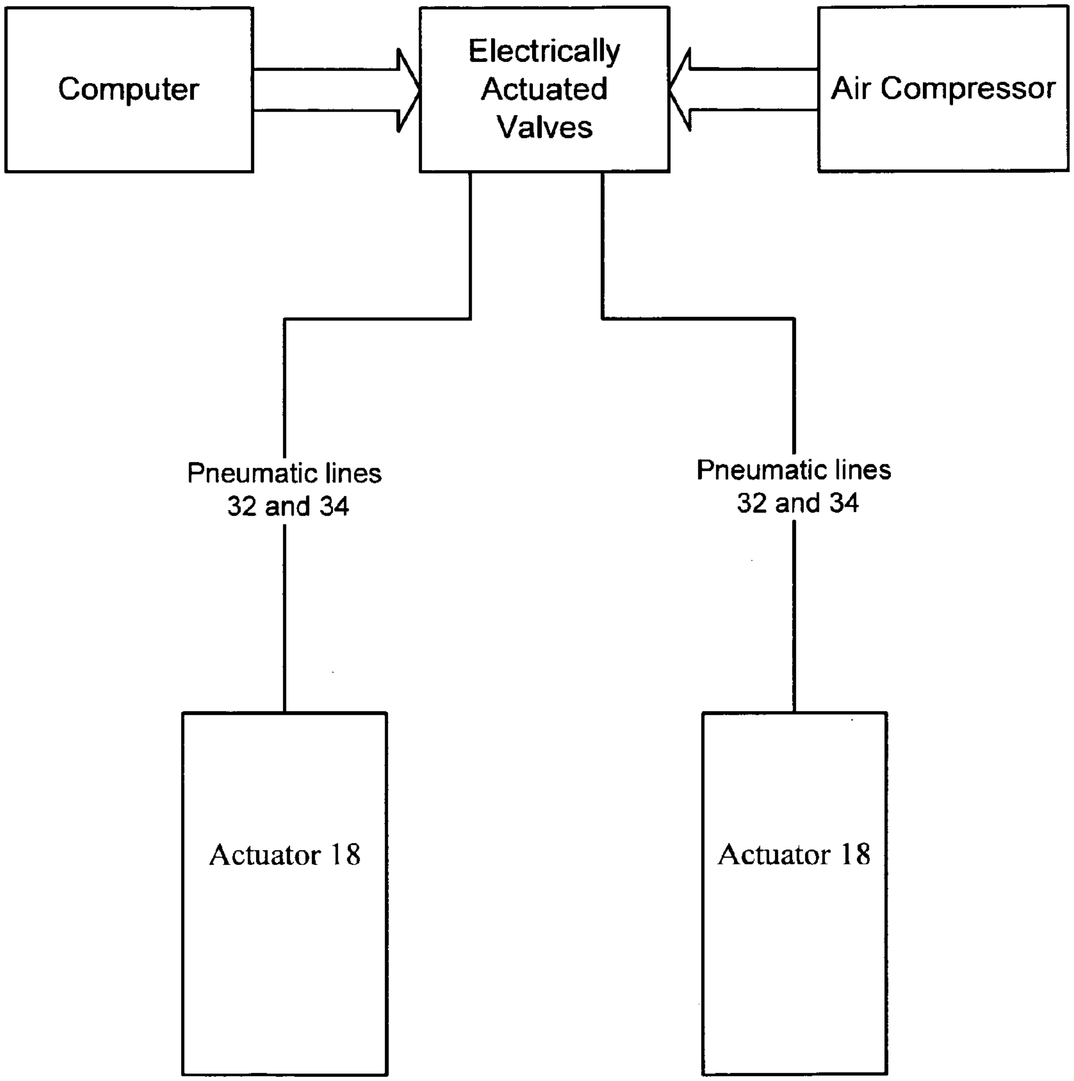
FIG. 10 (Prior Art)
FIG. 10 is a prior art block diagram showing remote control of the Gutter Drainage and Debris Removal System 10 (prior art U.S. Pat. No. 7,610,721).

FIG. 10 is a prior art block diagram that shows co-located electrically actuated valves.

Figure 11:
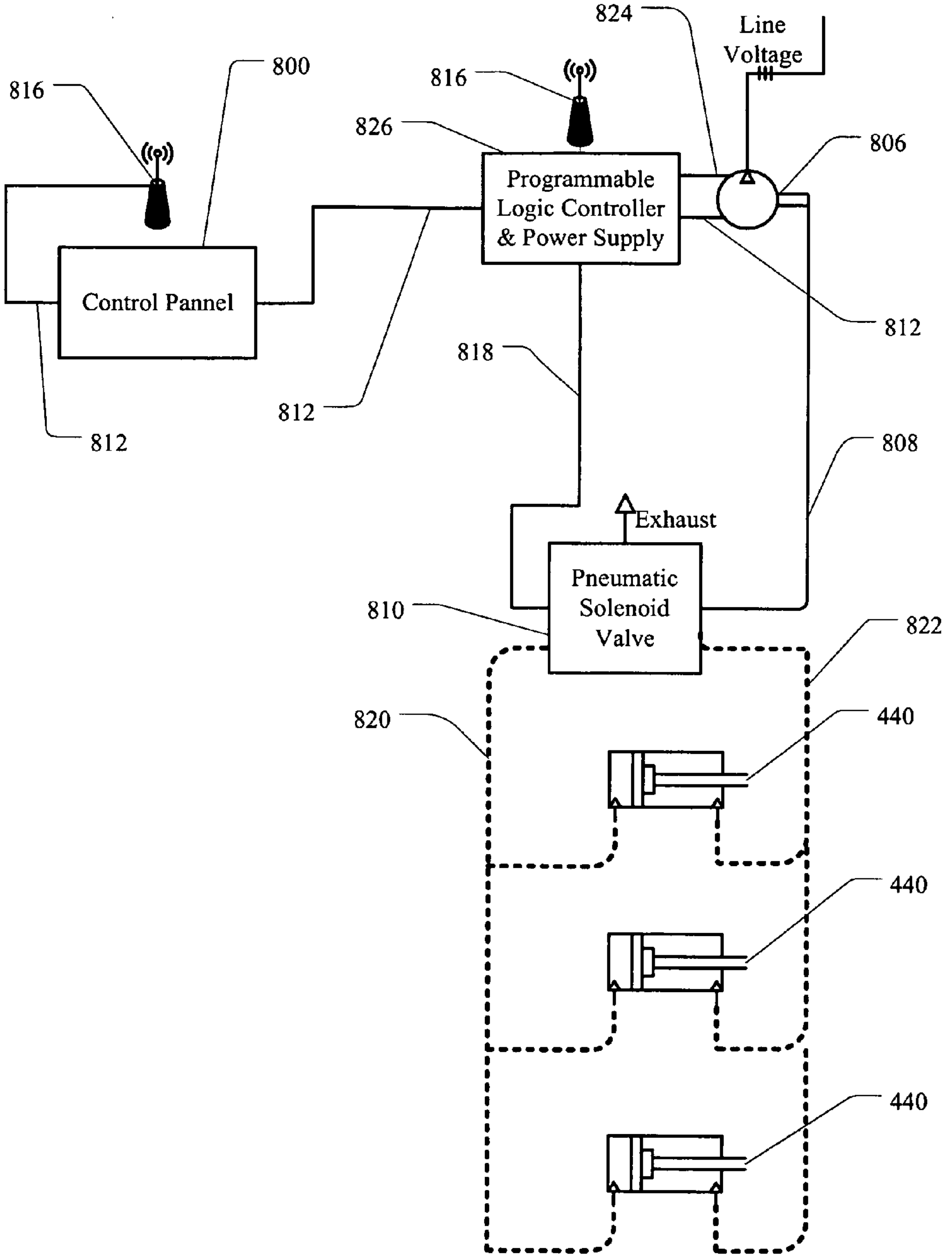
FIG. 11 is a block diagram showing centralized remote control for geographically separate installations of system 100.

FIG. 11 is a block diagram which shows scavenger systems 440 connected in parallel with air line open 820 (line 820) and air line close 822 (line 822). Pneumatic solenoid valve 810 controls lines 820 and 822. Pressurization of line 820 causes scavenger system 440 to move to the forward position as shown in FIG. 1*b*. Pressurization of line 822 causes scavenger system 440 to retract to park position as shown in FIG. 1*a*. As either line 822 or 820 are pressurized, air in the other line is exhausted through a port in pneumatic solenoid valve 810. Compressed air line 808 conveys pressurized air from air compressor 806 to pneumatic solenoid valve 810. $24^V$ line 818 transmits control power from programmable logic controller and power supply (PLC) 826 to pneumatic solenoid valve 810. Programmable logic controller and power supply 826 controls air compressor 806 through control line 824 and receives air compressor 806 feedback through logical signal and telemetry line 812. Control panel 800 contains circuitry necessary to signal PLC 826 to initiate scavenging routines, and control panel 800 can communicate through a logical signal and telemetry line 812 or by wireless receiver and transmitter 816 with PLC 826.

Operational Description

Wear plates 220 (FIG. 2*b*) provide lower contact friction for spring loaded piano hinge 320 (FIG. 3*b*) because the coefficient of friction between aluminum and stainless steel is less than aluminum against aluminum. Wear plates 220 are also rolling interface for roller 334 (FIG. 3*c*) and eliminate wear on fluid flow channel 200.

FIG. 3*b* shows face plate framework 302, by comparison (prior art) FIG. 9*b* shows scavenging blade 16 (U.S. Pat. No. 7,610,721) in profile. Face plate framework 302 is fashioned with enclosed box structures that have higher strength to weight ratios compared to an open channel construction of scavenging blade 16. The increased rigidity and strength of face plate framework 302 is needed to remove heavier debris from fluid flow channel 200.

FIG. 5*b* shows pinch angle 500 at approximately 44°. Pinch angle 500 implies the likelihood of scavenging difficulty. As the pinch angle becomes smaller, it is harder to expel solids during scavenging. FIG. 9*b* (prior art) shows a smaller pinch angle 500 of approximately 22° for a similar position in the scavenging cycle.

FIGS. 6*a*, 6*b*, and 6*c* show how spring loaded piano hinge 320 enhances the debris ejection process. As wiper plate 324 pivots about top surface 214, torque supplied by torsion springs in spring loaded piano hinge 320 accelerates the debris ejection process. Stop surface 216 limits rotational over travel of spring loaded piano hinge 320.

FIGS. 7*a*, 7*b*, 7*c*, 7*d*, and 7*e* illustrate how flexible wiper 315 interacts with fluid flow channel 200 during scavenging to remove small debris from fluid conveyance channel 200. As flexible wiper 315 advances during scavenging it experiences counter clockwise rotation relative to fluid flow channel. By consecutively exposing debris to additional wipers, this aids in removal of small debris. By comparison, prior art FIGS. 9*a*-9*c* show a wiper 13 with a continuous surface.

FIGS. 8*a*, 8*b*, 8*c*, 8*d*, and 8*e* illustrate how the gap between drip edge 19 and upper lip 312 is minimized throughout the scavenging cycle; this minimizes the opportunity for debris to fall behind the scavenger assembly 300 during a scavenging cycle. FIG. 9*c* (prior art) shows a larger gap 527. This improvement results from the choice of fluid flow channel 200 profile and scavenger system 440 pivot axis location.

Prior art shown FIG. 10 box diagram shows a co-location of all electrically actuated (pneumatic solenoid) valves. This prior art diagram and description (see column 4 line 26 of U.S. Pat. No. 7,610,721) describe a bank of centrally located electrically actuated valves with pneumatic (air) lines 32 and 34 running to systems 10. Because lines 32 and 34 must be alternately pressurized and vented during operation, the need for compressed air increases as lines 32 and 34 grow in length and internal diameter. This approach is sufficient for smaller buildings and houses.

FIG. 11 shows a relocated pneumatic solenoid valve 810 from a central bank to a branch location near each dependant series of scavenging systems 440. By lengthening compressed air line 808 and shortening air lines 820 and 822, the performance of scavenging system 440 is improved and the amount of compressed air needed per cycle is reduced. This improvement allows system 100 to be more easily employed on large homes and buildings.

FIG. 11 also shows a remote control panel which by virtue of wires 812 or wireless 816 communications permits central control 800 over separate system 100 installations on geographically separate buildings. Prior art FIG. 10 describes remote control of individual or groups of actuators within a single structure. By contrast FIG. 11 describes a means to remotely control entire installations of systems 100 located on separate structures in different geographical locations.

In the following claims, any terms indicative of orientation (e.g. front, back; left, right; upper, lower; top, bottom; and the like) are meant only to correspond with the illustrations as an aid to understanding the present disclosure. Such terms are not intended as positive limitations. The concept and scope of the present disclosure are only limited by the following claims.

PARTS LIST

| Number | Name | FIG. |
|---|---|---|
| 7 | Structure | 1a, 1b, 5a, 6a |
| 10 | Gutter Drainage and Debris Removal System (prior art) | 9a |
| 13 | Wiper (prior art) | 9c |
| 14 | Gutter Section (prior art) | 9a-9c |
| 16 | Scavenging Blade (prior art) | 9a-9c |
| 19 | Drip Edge | 8a-8e, 9a-9c |
| 32 | Pneumatic Line (prior art) | 10 |
| 34 | Pneumatic Air Line (prior art) | 10 |
| 100 | Combination Fluid Flow Channel and Scavenging System | 1a, 1b, 2a, 2b |
| 150 | Actuator defined in U.S. Pat. No. 7,610,721 | 1b, 2b, 4a, 4b |
| 154 | Pivot Tab | 2b |
| 200 | Fluid Flow Channel | 1a, 1b, 2b |
| 201 | Registration Edge | 2c |
| 202 | Registration Surface | 2c |
| 204 | Material Occlusion Ramp | 2c |
| 206 | Channel Floor | 2c |
| 208 | Curved Surface | 2c |
| 210 | Ramp Surface | 2c |
| 212 | Ramp Angle | 2c |
| 214 | Top Surface | 2c |
| 216 | Stop Surface | 2c |
| 218 | Hinge Clip | 2b, 5a, 5b |
| 220 | Wear Plate | 2b, 5a, 5b |
| 300 | Scavenger Assembly | 1a, 1b, 2b, 3a, 3b, 5a, 8a |
| 302 | Face Plate Framework | 3b |
| 304 | Face Plate | 3b |
| 306 | Rear Plate | 3b |
| 310 | End Cap | 3b |
| 312 | Upper Lip | 8a-8d |
| 315 | Flexible Wiper | 3b, 7a-7e |
| 316 | Wiper Body | 7a |
| 317 | Frontal Blade | 7a-7e |
| 318 | Mid Blade | 7a-7e |
| 319 | Trailing Blade | 7a, 7e |
| 320 | Spring Loaded Piano Hinge | 2b, 3b, 6a |
| 322 | Mounting Plate | 3b |
| 324 | Wiper Plate | 3b, 6a-6c |
| 330 | Caster Assembly | 3b, 3c |
| 332 | Caster Bracket | 3c |
| 334 | Roller | 3c, 5a |
| 336 | Shoulder Screw | 3c |
| 338 | Lock Nut | 3c, 4b |
| 440 | Scavenger System | 4a |
| 500 | Pinch Angle | 5b, 9b |
| 510 | Resistance Angle | 5a, 5b |
| 520 | Parking Angle | 5a |
| 527 | Gap | 9c |
| 800 | Control Panel | 11 |
| 806 | Air Compressor | 11 |
| 808 | Compressed Air Line | 11 |
| 810 | Pneumatic Solenoid Valve | 11 |
| 812 | Logical Signal and Telemetry Line | 11 |
| 816 | Wireless Receiver and Transmitter | 11 |
| 818 | 24 Volt Line | 11 |
| 820 | Air Line Open | 11 |
| 822 | Air Line Close | 11 |
| 824 | Compressor Power Control Line | 11 |
| 826 | Programmable Logic Controller and Power Supply | 11 |

What is claimed is:

1. A scavenger system with a face plate framework to expel solids from a fluid flow channel comprising:

(a) a structure for support of said channel and said scavenger system;

(b) said channel supported by said structure for conveyance of fluid;

(c) said scavenger system comprised of a scavenger assembly disposed lengthwise within said channel, for scavenging engagement with said channel;

(d) an actuator means comprised of a reciprocal expansible chamber device, pivotally connected to said structure for pivotal movement thereof while scavenging;

(e) said scavenger assembly further including a face plate framework;

(f) said face plate framework attached to said actuator means, and being propelled by said actuator means to expel solids from said channel;

(g) said face plate framework further comprised of a face plate, a rear plate, and an end cap forming a box shaped structure to better distribute resultant shear stresses within said framework, while said framework traverses said channel, thereby improving said scavenger performance by reducing twist thereof; and (h) said scavenger assembly including a bearing surface for contacting with said channel for support and friction reduction between said scavenger assembly and said channel.

2. The scavenger system as recited in claim 1, wherein the scavenger assembly further includes a plurality of depending flexible blades, attached to said scavenger assembly, for wiping debris from said channel.

3. The scavenger system as recited in claim 1, wherein the scavenger assembly further includes a pivotally mounted slider blade attached to said face plate framework for slidable, and pivotable engagement with said channel, thereby undercutting large solids within said channel.

* * * * *